(12) United States Patent
Tachikawa et al.

(10) Patent No.: US 6,928,044 B2
(45) Date of Patent: Aug. 9, 2005

(54) APPARATUS FOR FIXING HALF MIRROR OF OPTICAL PICKUP

(75) Inventors: Hitoshi Tachikawa, Osaka (JP); Hideaki Funakoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 424 days.

(21) Appl. No.: 10/052,065

(22) Filed: Jan. 16, 2002

(65) Prior Publication Data

US 2002/0118628 A1 Aug. 29, 2002

(30) Foreign Application Priority Data

Jan. 30, 2001 (JP) .................................. P. 2001-020863

(51) Int. Cl.[7] .................................................. G11B 7/00
(52) U.S. Cl. .................................. 369/112.29; 359/871
(58) Field of Search .......................... 369/44.15, 44.16, 369/112.01, 112.29; 359/871

(56) References Cited

U.S. PATENT DOCUMENTS 4,767,921 A * 8/1988 Kawasaki et al. ....... 250/201.5
6,046,866 A * 4/2000 Ikegame .................... 359/823
6,086,209 A * 7/2000 Miyahara et al. ........... 359/872
6,501,585 B2 * 12/2002 Shiraishi et al. ............ 359/204

FOREIGN PATENT DOCUMENTS

JP          60-80521          6/1985

* cited by examiner

Primary Examiner—Paul W. Huber
(74) Attorney, Agent, or Firm—Osha Liang LLP

(57) ABSTRACT

An apparatus for fixing a half mirror of an optical pickup includes a pair of left-hand-side and right-hand-side presser plate portions 12b, which are respectively extended from both side edge portions of the fastening device body 12a and caused to elastically abut against a surface of the half mirror 3. This apparatus further comprises a pair of left-hand-side and right-hand-side engaging claw portions 12c respectively bent from both side edge portions of the fastening device body 12a in a direction opposite to a direction, wherein the left-hand-side and right-hand-side presser plate portions 12b are extended, to thereby engage with the inner surface 5c, and a catch piece portion 12d bent from a central portion of the fastening device body 12a and extended to a peripheral edge of the opening portion 2a of the light passing hole 2.

7 Claims, 9 Drawing Sheets

APPARATUS FOR FIXING HALF MIRROR OF OPTICAL PICKUP

BACKGROUND OF THE INVENTION

1. Field of the Invention

The present invention relates to an apparatus for fixing a half mirror of an optical pickup for use in a disc player, for example, a DVD player.

2. Description of the Related Art

FIG. 8 shows an example of a conventional optical pickup. This optical pickup is adapted so that a half mirror 3 is disposed in a light passing hole 2 of a pickup body 1 in such a way as to be in an inclined state. An objective lens OL, and a set of a collimator lens QWP and a photodiode PD are respectively disposed at both sides of the pickup body 1 so that the half mirror 3 is placed therebetween. A semiconductor laser LD is provided in a branch hole 4 formed on a side surface of the pickup body 1. Laser light is projected from the semiconductor laser LD through the half mirror 3, the collimator lens QWP, and the objective lens OL onto a disc D. Then, light reflected there from is received by a photodiode PD through the half mirror 3. Thus, information recorded onto the disc D is read.

Conventional techniques for fixing the half mirror 3 are described in JP-A-60-80521U. An example of an apparatus using such techniques is described hereinbelow with reference to FIGS. 9 to 12. This example is formed so that the shape of the transversal section of a part of the light passing hole 2, which part stores the half mirror 3, is a rectangular, that the left-hand side surface 5a and the left-hand side surface 5b among four inner surfaces 5a to 5d of the rectangular part, and that triangular plates 6 are formed in such a manner as to be integral with both the left-hand inner side surface 5a and the right-hand inner side surface 5b, which face the side edges 3a and 3b, respectively. The half mirror 3 is put on slope-like top surfaces 6a of both the triangular plates 6. An innermost end edge 3c of the half mirror 3 is made to abut against a slope-like abutting face 7 formed on the bottom end of one 5c of the remaining inner side surfaces 5c and 5d. Moreover, a pair of a left-hand side concave groove and a right-hand side concave groove 8, which communicate with an opening portion 2a of the light transmitting hole 2, are formed on both sides of the other side surface 5d, respectively. A fastening device 9 constituted by a leaf spring is placed along the other side surface 5d.

As shown in FIGS. 11 and 12, the fastening device 9 comprises a fastening device body 9a placed along the latter side surface 5d, a pair of left-hand and right-hand leg plate portions 9b each of which has a nearly-L-shaped transversal section and is extended from a corresponding one of both the side edges of the fastening device body 9a and fitted into a corresponding one of the concave grooves 8, a pair of left-hand and right-hand presser plate portions 9c that are extended from the fastening device body 9a and elastically abut against the surface of the half mirror 3, a pair of left-hand and right-hand engaging claws 9d that are bent in a direction orthogonal to a direction, in which each of the presser plate portions 9c is extended, from the top ends of side surfaces of the leg plate portions 9b and engage the inner surfaces of the concave grooves 8, respectively, and a catch piece portion 9e, which is bent in a direction opposite to the direction, in which each of the presser plate portions 9c is extended, from the fastening device body 9a and faces the latter side surface 5d. Each of the leg plate portions 9b is fitted into a corresponding one of the concave grooves 8. Further, the fastening device body 9a is pushed into the light passing hole 2. Thus, the half mirror 3 is fixed in the light passing hole 2.

As illustrated in FIG. 9, in the apparatus of the aforementioned conventional configuration, the presser plate portion 9c is pressed against the half mirror 3 and elastically deformed by pushing the fastening device body 9a into the light passing hole 2. The half mirror 3 is pressed against and fixed to the slope-like top surfaces 6a of both the triangular plates 6 by a pushing force P that is generated owing to the elastic deformation of the presser plate portion 9c. A horizontal component F1 of a reaction force F generated by pushing the half mirror 3 in such a manner does not act in a direction in which this component F1 causes both the engaging claw portions 9d to bite into the inner surface portions of the concave grooves 8, respectively. Thus, a force for fixing the position of the fastening device body 9a in such a way as to prevent the body 9a from floating up is weak. Consequently, there is the possibility that the fastening body 9a is pushed up by a vertical component F2 of the reaction force F, so that the fixation of the half mirror 3 becomes unreliable.

SUMMARY OF THE INVENTION

In view of the drawbacks of the conventional apparatus, an object of the invention is to provide an apparatus for fixing a half mirror of an optical pickup, which is enabled to reliably fix the half mirror therein.

To achieve the foregoing object, according to an aspect of the invention, there is provided an apparatus (hereunder referred to as a first apparatus of the invention) for fixing a half mirror of an optical pickup. In this apparatus, the half mirror is disposed in a light passing hole of a pickup body in such a way as to be in an inclined state. Further, a pair of left-hand-side and right-hand-side concave grooves communicating with an opening portion of a light passing hole are respectively formed in both side portions of an inner surface facing the innermost edge of a half mirror, among four inner surfaces of the light passing hole. Furthermore, both side edge portions of a fastening device body of a fastening device constituted by a leaf spring are inserted into and passed through both the concave grooves, respectively. This apparatus comprises a pair of left-hand-side and right-hand-side presser plate portions, which are respectively extended from both side edge portions of the fastening device body and caused to elastically abut against a surface of the half mirror. This apparatus further comprises a pair of left-hand-side and right-hand-side engaging claw portions respectively bent from both side edge portions of the fastening device body in a direction opposite to a direction, in which the left-hand-side and right-hand-side presser plate portions are extended, to thereby engage with the inner surface, and a catch piece portion bent from a central portion of the fastening device body and extended to a peripheral edge of the opening portion of the light passing hole.

According to the first apparatus of the aforementioned configuration, a pair of left-hand-side and right-hand-side concave grooves communicating with an opening portion of a light passing hole are respectively formed in both side portions of an inner surface facing the innermost edge of a half mirror, among four inner surfaces of the light passing hole. Thus, the fastening device body can be placed in a predetermined manner along the inner surface, which faces the innermost edge of the half mirror, only by inserting both the side edge portions of the fastening device body into both the concave grooves, respectively.

Further, the pair of left-hand-side and right-hand-side presser plate portions are pressed against the surface of the half mirror and elastically deformed by pushing the fastening device body thereinto. When the half mirror is fixed thereto in an inclined state by a pushing force generated owing to the elastic deformation of the presser plate portions, a pair of left-hand-side and right-hand-side engaging claw portions to be bent in a direction opposite to a direction, in which both the presser plate portions are extended, are engaged with each other by a horizontal component of a reaction force, which is generated by pushing the presser plate portions, in such a way as to bite with the inner surface. A biting force caused by both the engaging claw portions increases in proportion to the pushing force. Thus, the fastening device is not pushed up by a vertical component of the reaction force. Consequently, the half mirror can be reliably fixed to a predetermined place in the light passing hole.

Furthermore, both the presser plate portions can be pressed against a surface of the half mirror by the predetermined pushing force only by pushing the fastening device body into the light passing hole until the catching piece portion bent from the central portion of the fastening device body touches the peripheral edge of the opening portion of the light passing hole. Moreover, the fastening device body is drawn out of the light passing hole only by pulling the catch piece portion. Consequently, the fixed state of the half mirror can easily be canceled.

According to another aspect of the invention, there is provided an apparatus (hereunder referred to as a second apparatus of the invention) for fixing a half mirror of an optical pickup. In this apparatus, the half mirror is disposed in a light passing hole of a pickup body in such a way as to be in an inclined state. Further, a pair of left-hand-side and right-hand-side concave grooves communicating with an opening portion of a light passing hole are respectively formed in both side portions of an inner surface facing the innermost edge of a half mirror, among four inner surfaces of the light passing hole. Furthermore, both side edge portions of a fastening device body of a fastening device constituted by a leaf spring are inserted into and passed through both the concave grooves, respectively. This apparatus comprises a pair of left-hand-side and right-hand-side presser plate portions, which are respectively extended from both side edge portions of the fastening device body and caused to elastically abut against a surface of the half mirror. This apparatus further comprises a connecting plate portion, provided between tip ends of both the presser plate portions, for integrally connecting both the presser plate portions to each other. This connecting plate portion is bent so that a transverse section thereof is nearly-L-shaped. A nearly-L-shaped recess part of the connecting plate portion is engaged with an opening-portion-side edge of the half mirror. This apparatus further comprises a pair of left-hand-side and right-hand-side engaging claw portions respectively bent from both side edge portions of the fastening device body in a direction opposite to a direction, in which the left-hand-side and right-hand-side presser plate portions are extended, to thereby engage with the inner surface, and a catch piece portion bent from a central portion of the fastening device body and extended to a peripheral edge of the opening portion of the light passing hole.

According to the second apparatus of the aforementioned configuration, a pair of left-hand-side and right-hand-side concave grooves communicating with an opening portion of a light passing hole are respectively formed in both side portions of an inner surface facing the innermost edge of a half mirror, among four inner surfaces of the light passing hole. Thus, the fastening device body can be placed in a predetermined manner along the inner surface, which faces the innermost edge of the half mirror, only by inserting both the side edge portions of the fastening device body into both the concave grooves, respectively.

Further, the pair of left-hand-side and right-hand-side presser plate portions are pressed against the surface of the half mirror and elastically deformed by pushing the fastening device body thereinto. When the half mirror is fixed thereto in an inclined state by a pushing force generated owing to the elastic deformation of the presser plate portions, a pair of left-hand-side and right-hand-side engaging claw portions to be bent in a direction opposite to a direction, in which both the presser plate portions are extended, are engaged with each other by a horizontal component of a reaction force, which is generated by pushing the presser plate portions, in such a way as to bite with the inner surface. A biting force caused by both the engaging claw portions increases in proportion to the pushing force. Thus, the fastening device is not pushed up by a vertical component of the reaction force. Consequently, the half mirror can be reliably fixed to a predetermined place in the light passing hole.

Moreover, both the presser plate portions can be pressed against a surface of the half mirror by the predetermined pushing force only by pushing the fastening device body into the light passing hole until the catching piece portion bent from the central portion of the fastening device body touches the peripheral edge of the opening portion of the light passing hole. Moreover, the fastening device body is drawn out of the light passing hole only by pulling the catch piece portion. Consequently, the fixed state of the half mirror can easily be canceled.

Furthermore, the tip ends of both the presser plate portions are integrally connected through the connecting plate portion to each other, so that both the presser plate portions are reinforced in such a manner as not to be twisted. Thus, the half mirror can be more reliably fixed therein by both the presser plate portions. Further, the nearly-L-shaped recess part of the connecting plate portion is engaged with the opening-portion-side edge of the half mirror, so that the half mirror can be reliably fixed therein in such a way as not to unexpectedly move.

According to another aspect of the invention, there is provided an apparatus (hereunder referred to as a third apparatus of the invention) for fixing a half mirror of an optical pickup. In this apparatus, the half mirror is disposed in a light passing hole of a pickup body in such a way as to be in an inclined state. This apparatus comprises a pair of left-hand-side and right-hand-side presser plate portions, which are respectively extended from both side edge portions of a fastening device body of a fastening device constituted by a leaf spring and which are caused to elastically abut against a surface of the half mirror, and a pair of left-hand-side and right-hand-side engaging claw portions respectively bent from both side edge portions of the fastening device body in a direction opposite to a direction, in which the left-hand-side and right-hand-side presser plate portions are extended, to thereby engage with the inner surface of the light passing hole.

According to the third apparatus of the invention, the pair of left-hand-side and right-hand-side presser plate portions are pressed against the surface of the half mirror and elastically deformed by pushing the fastening device body thereinto. When the half mirror is fixed thereto in an inclined state by a pushing force generated owing to the elastic deformation of the presser plate portions, a pair of left-hand-side and right-hand-side engaging claw portions to be bent in a direction opposite to a direction, in which both the presser plate portions are extended, are engaged with each other by a horizontal component of a reaction force, which is generated by pushing the presser plate portions, in such a way as to bite with the inner surface. A biting force caused by both the engaging claw portions increases in proportion to the pushing force. Thus, the fastening device is not pushed up by a vertical component of the reaction force. Consequently, the half mirror can be reliably fixed to a predetermined place in the light passing hole.

According to an embodiment (hereunder referred to as a fourth apparatus of the invention) of the third apparatus of the invention, a pair of left-hand-side and right-hand-side concave grooves communicating with an opening portion of a light passing hole are respectively formed in both side portions of an inner surface facing an innermost edge of a half mirror, among four inner surfaces of the light passing hole. Further, both side edge portions of the fastening device are inserted into and passed through both the concave grooves, respectively.

According to the fourth apparatus of the invention, the pair of left-hand-side and right-hand-side concave grooves are respectively formed in both side portions of the inner surface facing the innermost edge of the half mirror, among the four inner surfaces of the light passing hole. Thus, the fastening device body can be placed in a predetermined manner along the inner surface, which faces the innermost edge of the half mirror, only by inserting both the side edge portions of the fastening device body into both the concave grooves, respectively.

An embodiment (hereunder referred to as a fifth apparatus of the invention) of the third or fourth apparatus of the invention further comprises a catch piece portion bent from a central portion of the fastening device body and extended to a peripheral edge of the opening portion of the light passing hole.

According to the fifth apparatus of the invention, both the presser plate portions can be pressed against a surface of the half mirror by a predetermined pushing force only by pushing the fastening device body into the light passing hole until the catching piece portion bent from a central portion of the fastening device body touches the peripheral edge of the opening portion of the light passing hole. Moreover, the fastening device body is drawn out of the light passing hole only by pulling the catch piece portion. Consequently, the fixed state of the half mirror can easily be canceled.

An embodiment (hereunder referred to as a sixth apparatus of the invention) of one of the third to fifth apparatuses of the invention further comprises a connecting plate portion provided between tip ends of both the presser plate portions and used for integrally connecting both the presser plate portions to each other.

According to the sixth apparatus of the invention, both the presser plate portions are reinforced in such a manner as not to be twisted. Thus, the half mirror can be more reliably fixed therein by both the presser plate portions.

According to an embodiment (hereunder referred to as a seventh apparatus of the invention) of the sixth apparatus of the invention, the connecting plate portion is bent so that a transverse section thereof is nearly-L-shaped. Further, a nearly-L-shaped recess part of the connecting plate portion is engaged with an opening-portion-side edge of the half mirror.

According to the seventh apparatus of the invention, the nearly-L-shaped recess part of the connecting plate portion is engaged with the opening-portion-side edge of the half mirror. Thus, the half mirror can be reliably fixed therein in such a way as not to unexpectedly move.

DETAILED DESCRIPTION OF THE PREFERRED EMBODIMENTS

Figure 1:
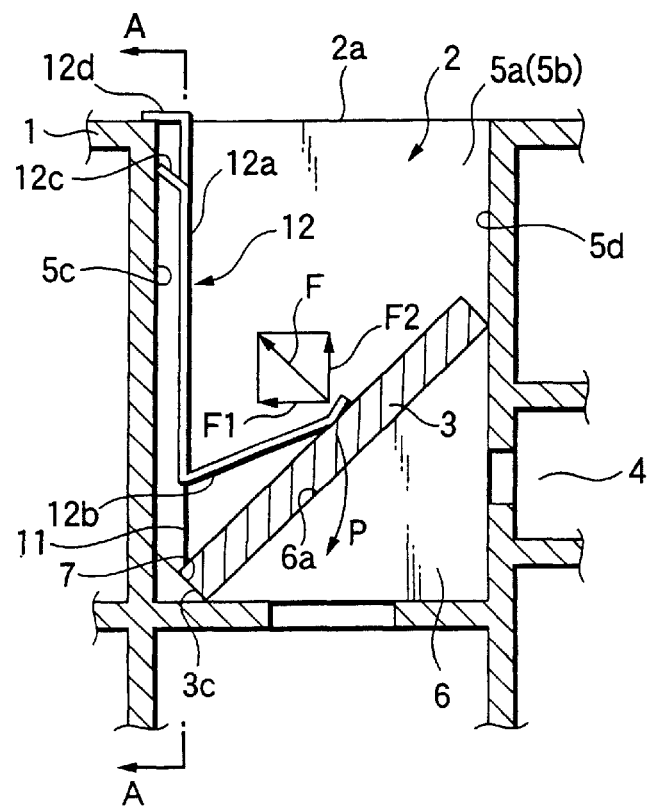
FIG. 1 is a longitudinally sectional view illustrating an apparatus for fixing a half mirror of an optical pickup, which is an embodiment of the invention.
Figure 2:
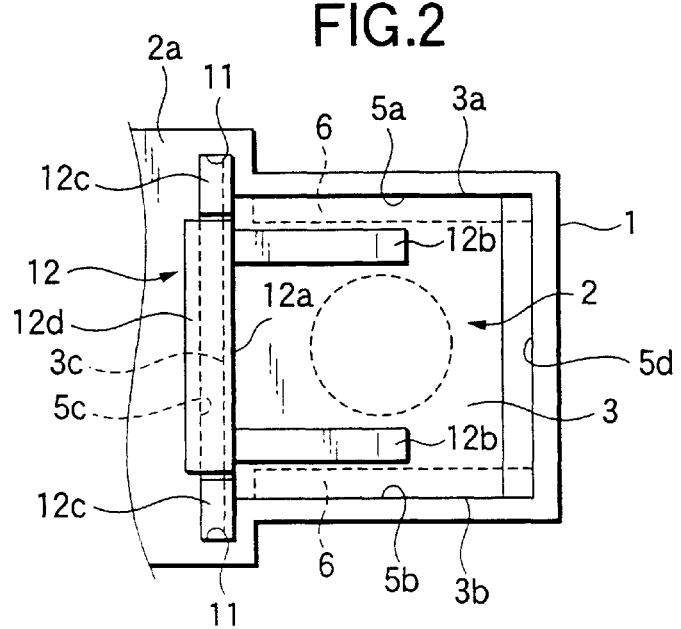
FIG. 2 is a plan view illustrating the embodiment.
Figure 3:
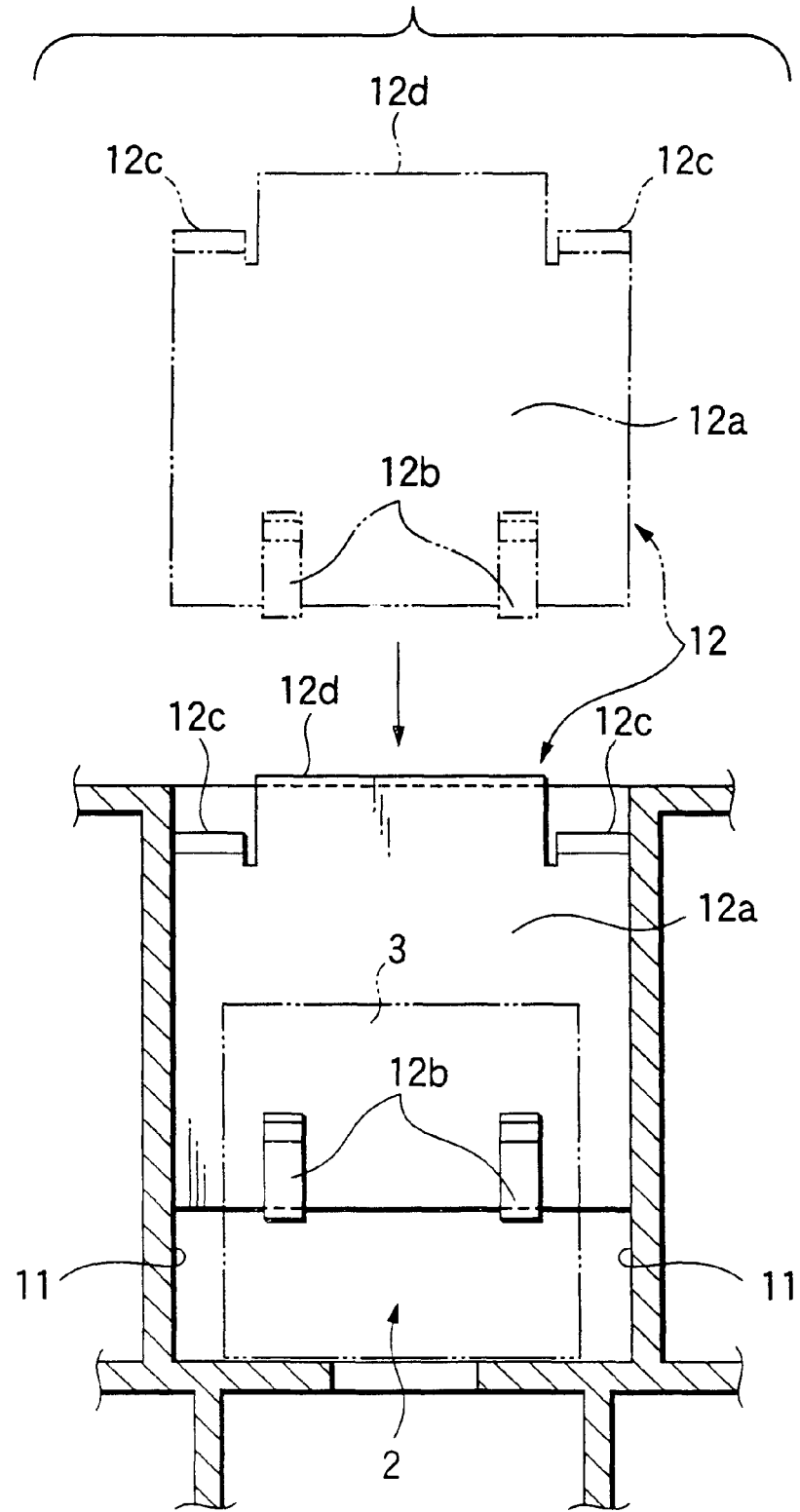
FIG. 3 is a sectional view taken in the direction of arrows on line A—A of FIG. 1.
Figure 4:
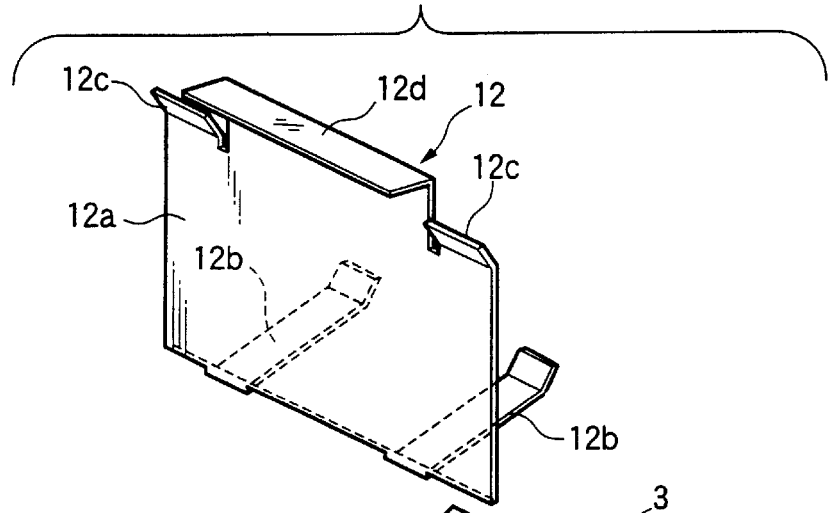
FIG. 4 is an exploded perspective view illustrating the embodiment.
Figure 4:
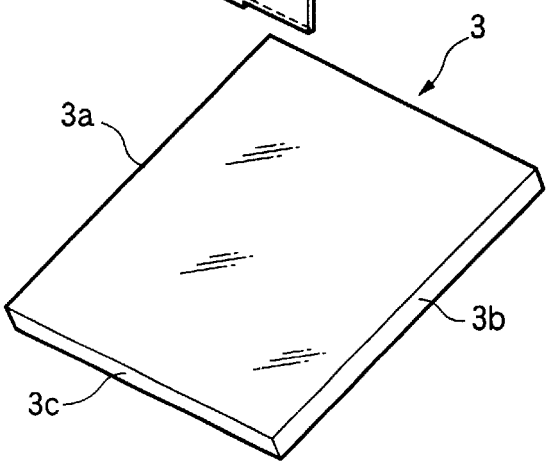
Figure 4:
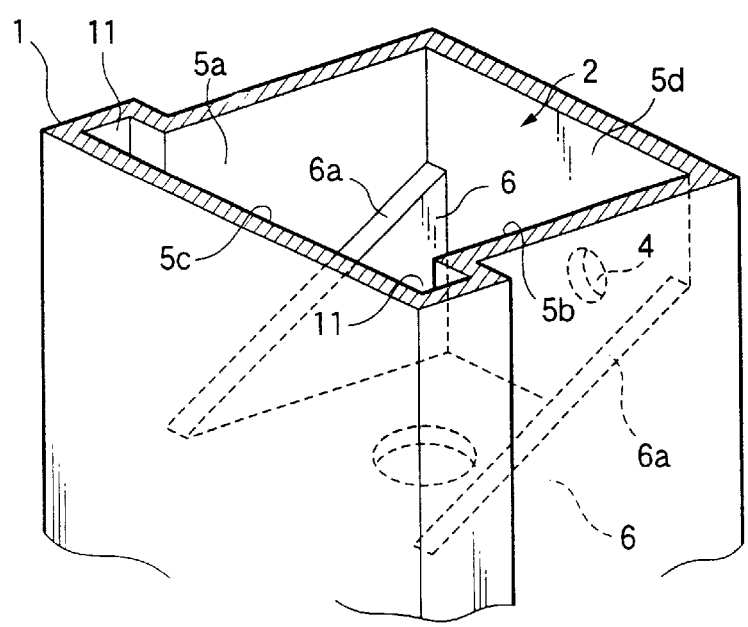

Now, a description will be given in more detail of preferred embodiments of the invention with reference to the accompanying drawings.

FIGS. 1 to 4 illustrate an apparatus for fixing a half mirror of an optical pickup, which is an embodiment of the invention. In this apparatus, a pair of left-hand-side and right-hand-side concave grooves 11 communicating with an opening portion 2a of a light passing hole 2 are respectively formed in both side portions of an inner surface 5c facing the innermost edge 3c of a half mirror 3, among four inner surfaces 5a to 5d of the light passing hole 2, and in which both side edge portions of a fastening device body 12a of a fastening device 12 constituted by a leaf spring are inserted into and passed through both the concave grooves 11, respectively. This apparatus comprises a pair of left-hand-side and right-hand-side presser plate portions 12b, which are respectively extended from both side edge portions of the fastening device body 12a and caused to elastically abut against a surface of the half mirror 3. This apparatus further comprises a pair of left-hand-side and right-hand-side engaging claw portions 12c respectively bent from both side edge portions of the fastening device body 12a in a direction opposite to a direction, in which the left-hand-side and right-hand-side presser plate portions 12b are extended, to thereby engage with the inner surface 5c, and a catch piece portion 12d bent from a central portion of the fastening device body 12a and extended to a peripheral edge of the opening portion 2a of the light passing hole 2. Constituent portions other than the aforementioned constituent elements of this apparatus are almost the same as those illustrated in FIGS. 9 to 12. Therefore, like constituent portions are designated by like reference characters in these figures. Further, the description of such constituent portions is omitted herein.

According to the aforementioned configuration, the pair of left-hand-side and right-hand-side concave grooves 11 communicating with the opening portion 2a of the light passing hole 2 are respectively formed in both side portions of the inner surface 5c facing the innermost edge 3c of the half mirror 3, among the four inner surfaces 5a to 5d of the light passing hole 2. Thus, the fastening device body 12a can be placed in a predetermined manner along the inner surface 5c, which faces the innermost edge 3c of the half mirror 3, only by inserting both the side edge portions of the fastening device body 12a into both the concave grooves 11, respectively.

Further, as illustrated in FIG. 1, the pair of left-hand-side and right-hand-side presser plate portions 12b are pressed against the surface of the half mirror 3 and elastically deformed by pushing the fastening device body 12a thereinto. When the half mirror 3 is pushed against the slope-like top surface 6a of the triangular plate 6 and fixed thereto in an inclined state by a pushing force P generated owing to the elastic deformation of the presser plate portions 12b, a pair of left-hand-side and right-hand-side engaging claw portions 12c to be bent in a direction opposite to a direction, in which both the presser plate portions 12b are extended, are engaged with each other by a horizontal component F1 of a reaction force F, which is generated by pushing the presser plate portions 12b, in such a way as to bite with the inner surface 5c. A biting force caused by both the engaging claw portions 12c increases in proportion to the pushing force P. Thus, the fastening device 12a is not pushed up by a vertical component F2 of the reaction force F. Consequently, the half mirror 3 can be reliably fixed to a predetermined place in the light passing hole 2.

Furthermore, both the presser plate portions 12b can be pressed against a surface of the half mirror 3 by the predetermined pushing force P only by pushing the fastening device body 12a into the light passing hole 2 until the catching piece portion 12d bent from a central portion of the fastening device body 12a touches the peripheral edge of the opening portion 2a of the light passing hole 2. Moreover, the fastening device body 12a is drawn out of the light passing hole 2 only by pulling the catch piece portion 12d. Consequently, the fixed state of the half mirror 3 can easily be canceled.

Figure 5:
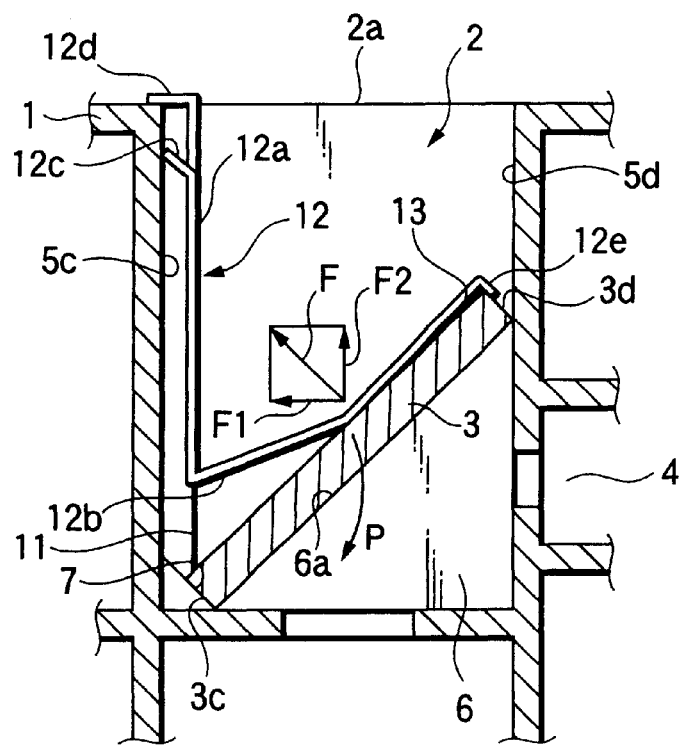
FIG. 5 is a longitudinally sectional view illustrating an apparatus for fixing a half mirror of an optical pickup, which is another embodiment of the invention.
Figure 6:
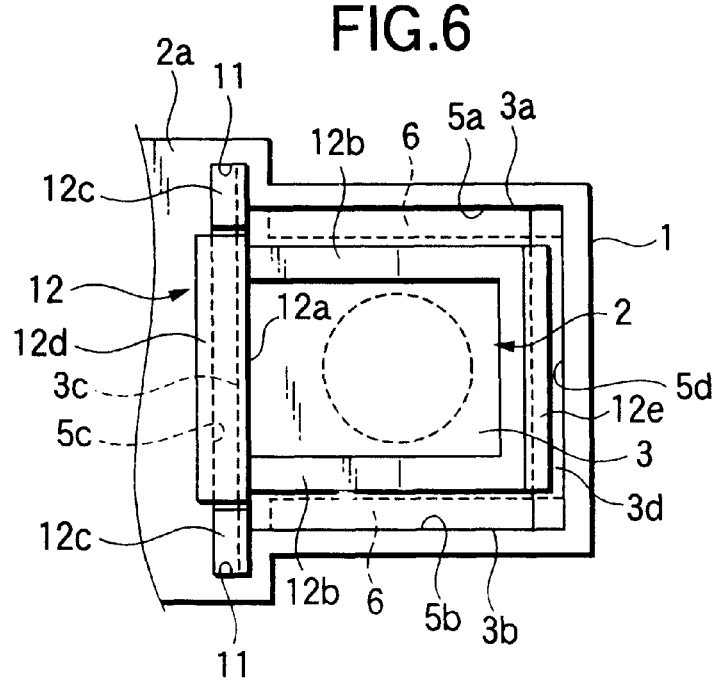
FIG. 6 is a plan view illustrating this embodiment.
Figure 7:
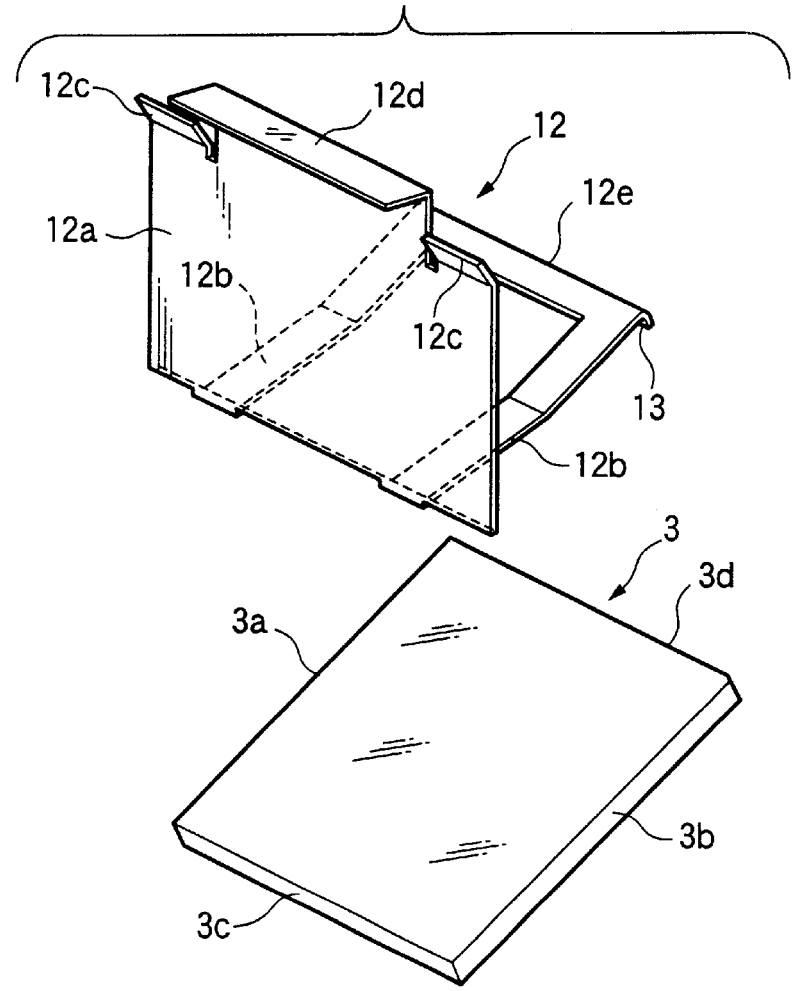
FIG. 7 is an exploded perspective view illustrating this embodiment.
Figure 7:
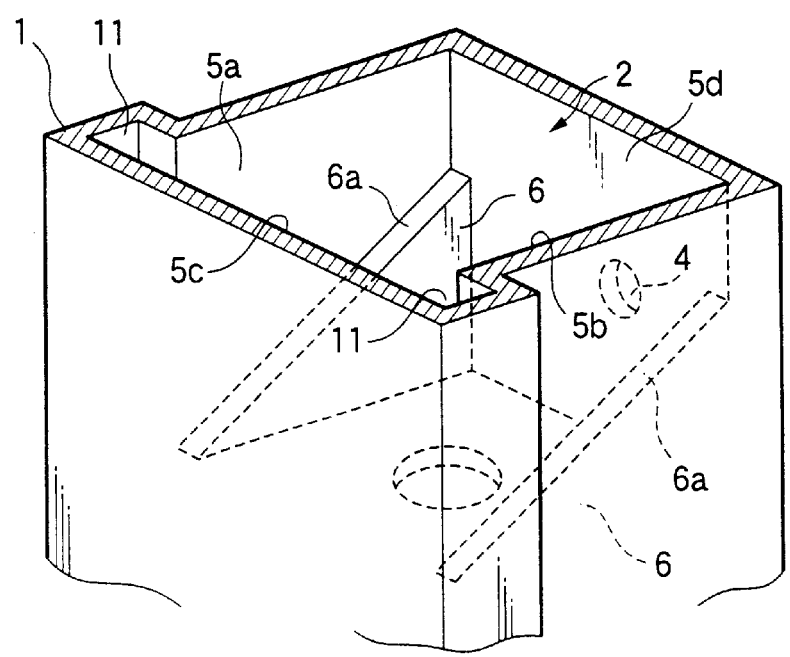
Figure 8:
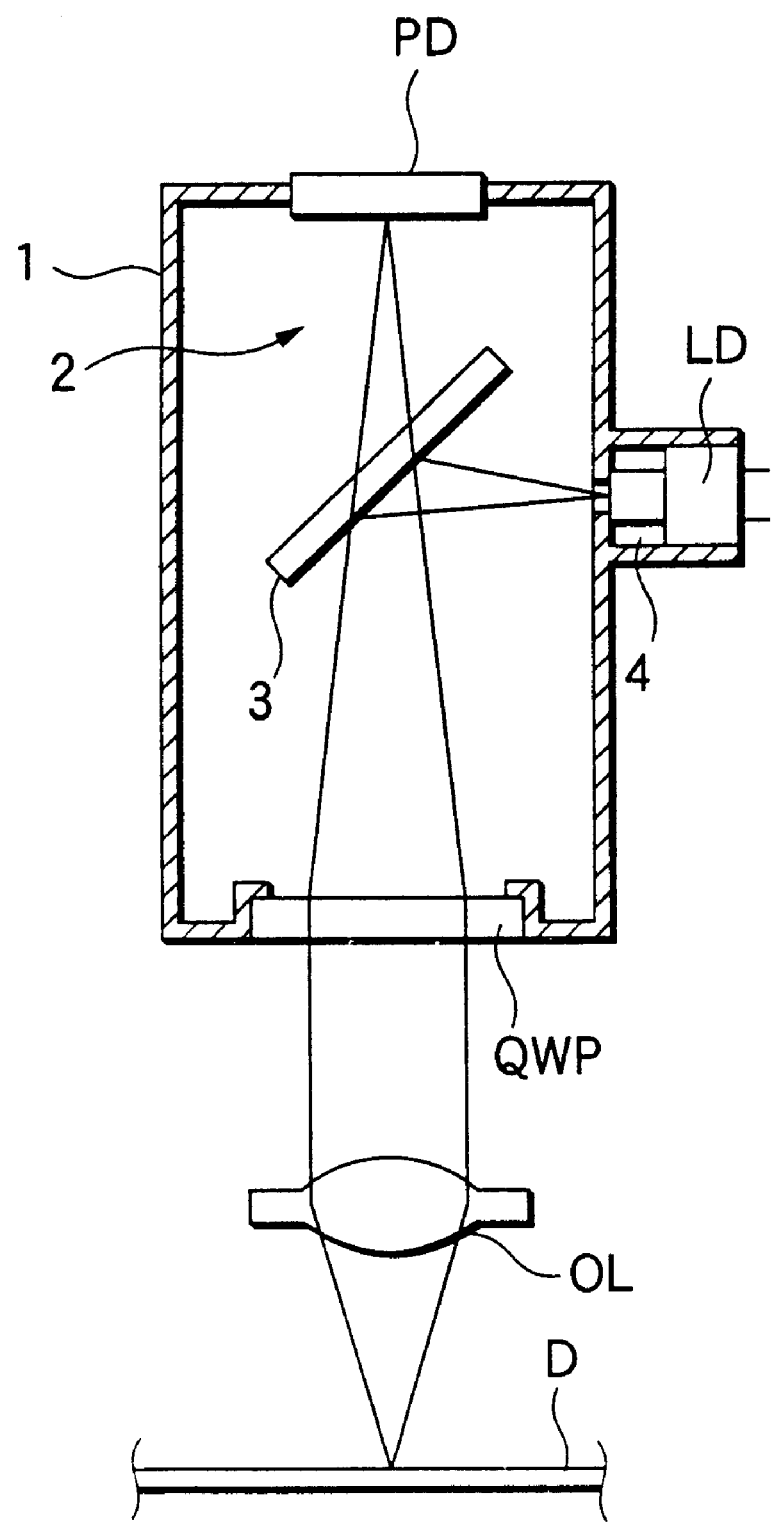
FIG. 8 is a schematic longitudinally sectional view illustrating the principle of an optical pickup.
Figure 9:
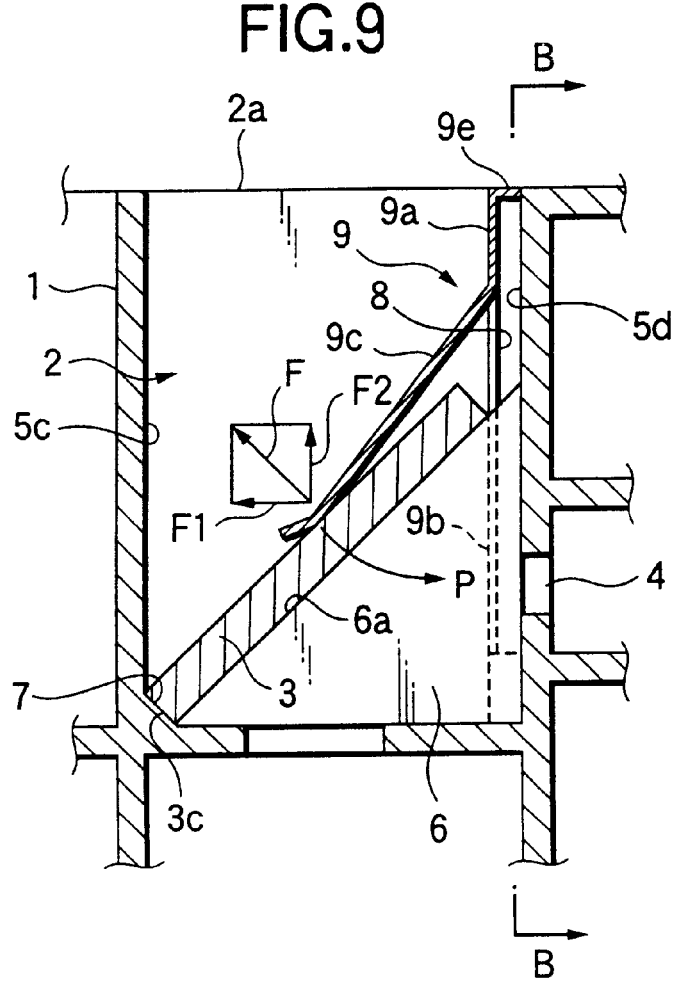
FIG. 9 is a longitudinally sectional view illustrating a conventional apparatus.
Figure 10:
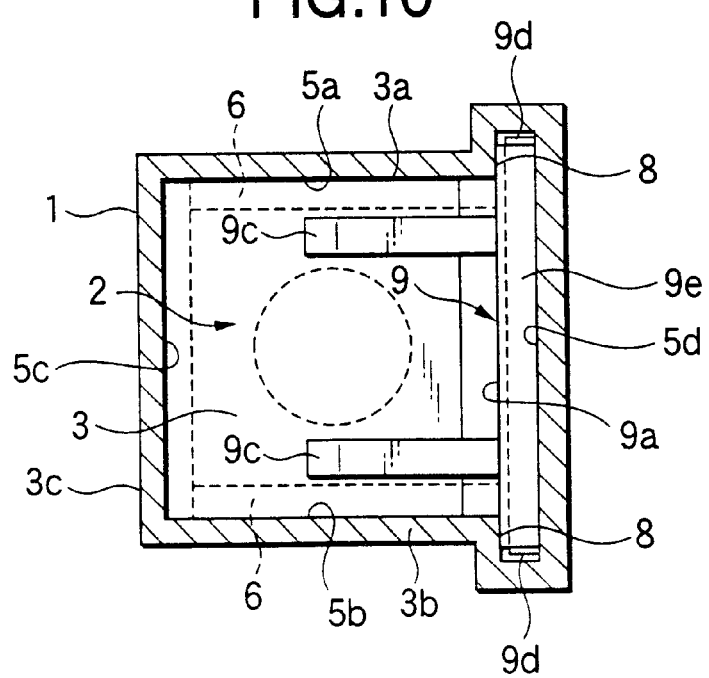
FIG. 10 is a horizontally sectional view illustrating the conventional apparatus.
Figure 11:
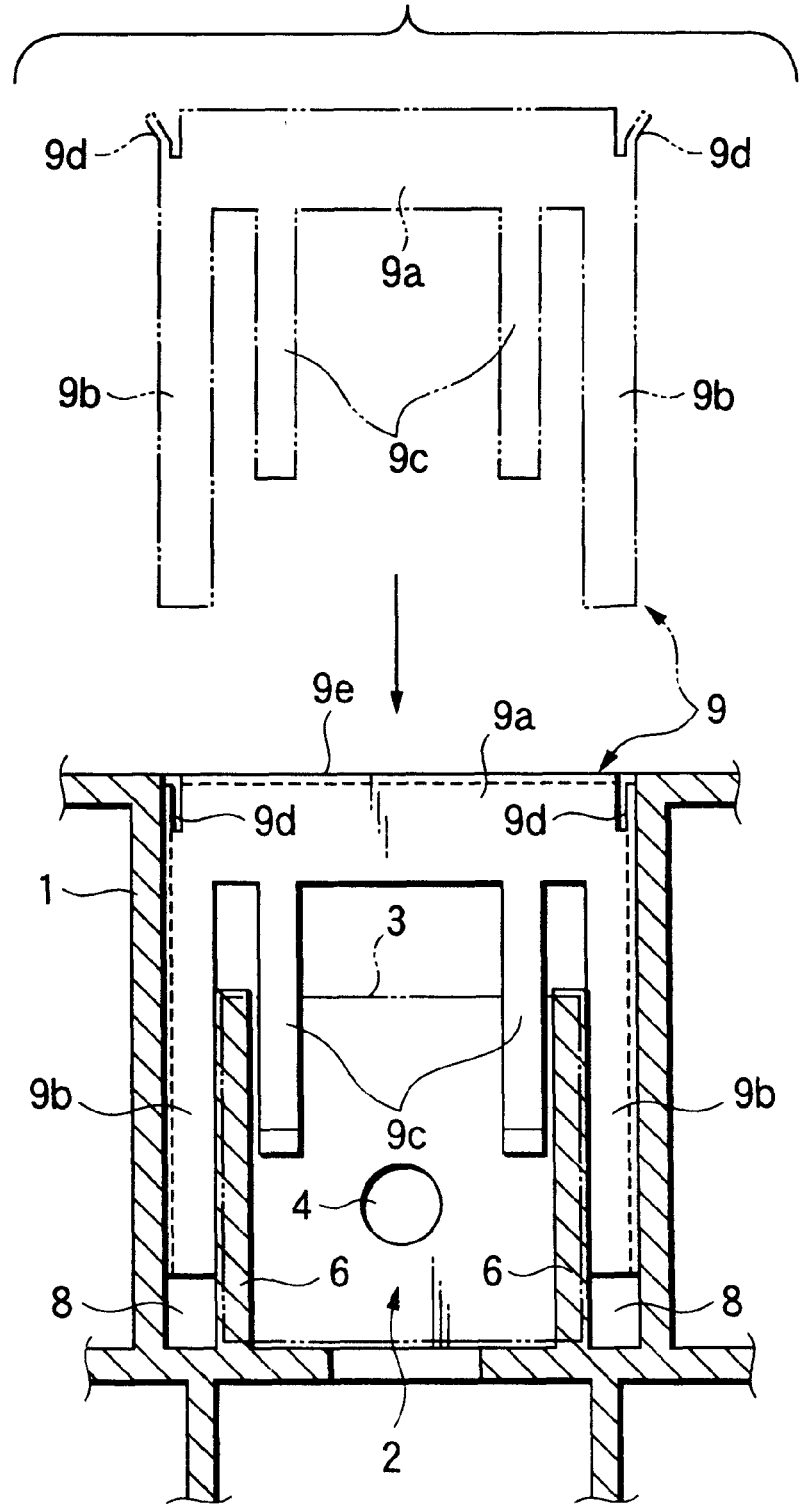
FIG. 11 is a sectional view taken in the direction of arrows on line B—B of FIG. 9.
Figure 12:
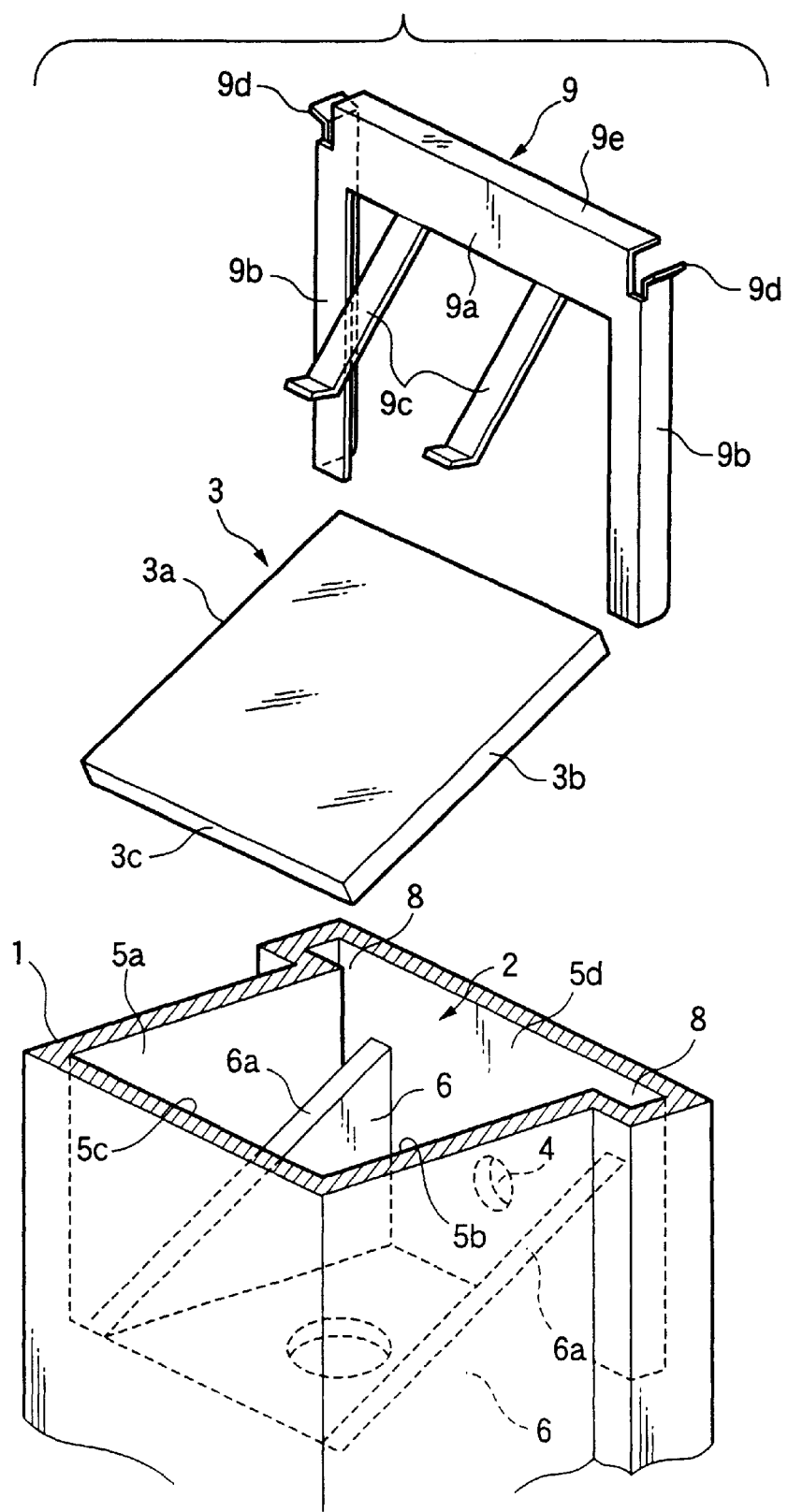
FIG. 12 is an exploded perspective view illustrating the conventional apparatus.

FIGS. 5 to 7 illustrate an apparatus for fixing a half mirror of an optical pickup, which is another embodiment of the invention. This apparatus comprises a connecting plate portion 12e for integrally connecting both the presser plate portions 12b to each other between tip ends thereof. The connecting plate portion 12e is bent so that the transverse section thereof is nearly-L-shaped, and that a nearly-L-shaped recess portion 13 is engaged with an opening-portion-side edge 3d. Constituent portions other than the aforementioned constituent elements of this apparatus are almost the same as those illustrated in FIGS. 1 to 4. Therefore, like constituent portions are designated by like reference characters in these figures. Further, the description of such constituent portions is omitted herein.

With the aforementioned configuration, this apparatus can obtain effects almost similar to those of the embodiment illustrated in FIGS. 1 to 4. Moreover, the tip ends of both the presser plate portions 12b are integrally connected through the connecting plate portion 12e to each other, so that both the presser plate portions 12e are reinforced in such a manner as not to be twisted. Thus, the half mirror 3 can be more reliably fixed therein by both the presser plate portions 12b. Furthermore, the nearly-L-shaped recess part 13 of the connecting plate portion 12e is engaged with the opening-portion-side edge 3d of the half mirror 3, so that the half mirror 3 can be reliably fixed therein in such a way as not to unexpectedly move.

According to the first apparatus of the invention, a pair of left-hand-side and right-hand-side concave grooves are respectively formed in both side portions of an inner surface facing the innermost edge of a half mirror, among four inner surfaces of a light passing hole. Thus, the fastening device body can be placed in a predetermined manner along the inner surface, which faces the innermost edge of the half mirror, only by inserting both the side edge portions of the fastening device body into both the concave grooves, respectively.

Further, the pair of left-hand-side and right-hand-side presser plate portions are pressed against the surface of the half mirror and elastically deformed by pushing the fastening device body thereinto. When the half mirror is fixed thereto in an inclined state by a pushing force generated owing to the elastic deformation of the presser plate portions, a pair of left-hand-side and right-hand-side engaging claw portions to be bent in a direction opposite to a direction, in which both the presser plate portions are extended, are engaged with each other by a horizontal component of a reaction force, which is generated by pushing the presser plate portions, in such a way as to bite with the inner surface. A biting force caused by both the engaging claw portions increases in proportion to the pushing force. Thus, the fastening device is not pushed up by a vertical component of the reaction force. Consequently, the half mirror can be reliably fixed to a predetermined place in the light passing hole.

Moreover, both the presser plate portions can be pressed against a surface of the half mirror by the predetermined pushing force only by pushing the fastening device body into the light passing hole until the catching piece portion bent from the central portion of the fastening device body touches the peripheral edge of the opening portion of the light passing hole. Moreover, the fastening device body is drawn out of the light passing hole only by pulling the catch piece portion. Consequently, the fixed state of the half mirror can easily be canceled.

According to the second apparatus of the invention, a pair of left-hand-side and right-hand-side concave grooves communicating with an opening portion of a light passing hole are respectively formed in both side portions of an inner surface facing the innermost edge of a half mirror, among four inner surfaces of the light passing hole. Thus, the fastening device body can be placed in a predetermined manner along the inner surface, which faces the innermost edge of the half mirror, only by inserting both the side edge portions of the fastening device body into both the concave grooves, respectively.

Further, the pair of left-hand-side and right-hand-side presser plate portions are pressed against the surface of the half mirror and elastically deformed by pushing the fastening device body thereinto. When the half mirror is fixed thereto in an inclined state by a pushing force generated owing to the elastic deformation of the presser plate portions, a pair of left-hand-side and right-hand-side engaging claw portions to be bent in a direction opposite to a direction, in which both the presser plate portions are extended, are engaged with each other by a horizontal component of a reaction force, which is generated by pushing the presser plate portions, in such a way as to bite with the inner surface. A biting force caused by both the engaging claw portions increases in proportion to the pushing force. Thus, the fastening device is not pushed up by a vertical component of the reaction force. Consequently, the half mirror can be reliably fixed to a predetermined place in the light passing hole.

Moreover, both the presser plate portions can be pressed against a surface of the half mirror by the predetermined pushing force only by pushing the fastening device body into the light passing hole until the catching piece portion bent from the central portion of the fastening device body touches the peripheral edge of the opening portion of the light passing hole. Moreover, the fastening device body is drawn out of the light passing hole only by pulling the catch piece portion. Consequently, the fixed state of the half mirror can easily be canceled.

Furthermore, the tip ends of both the presser plate portions are integrally connected through the connecting plate portion to each other, so that both the presser plate portions are reinforced in such a manner as not to be twisted. Thus, the half mirror can be more reliably fixed therein by both the presser plate portions. Further, the nearly-L-shaped recess part of the connecting plate portion is engaged with the opening-portion-side edge of the half mirror, so that the half mirror can be reliably fixed therein in such a way as not to unexpectedly move.

According to the third apparatus of the invention, the pair of left-hand-side and right-hand-side presser plate portions are pressed against the surface of the half mirror and elastically deformed by pushing the fastening device body thereinto. When the half mirror is fixed thereto in an inclined state by a pushing force generated owing to the elastic deformation of the presser plate portions, a pair of left-hand-side and right-hand-side engaging claw portions to be bent in a direction opposite to a direction, in which both the presser plate portions are extended, are engaged with each other by a horizontal component of a reaction force, which is generated by pushing the presser plate portions, in such a way as to bite with the inner surface. A biting force caused by both the engaging claw portions increases in proportion to the pushing force. Thus, the fastening device is not pushed up by a vertical component of the reaction force. Consequently, the half mirror can be reliably fixed to a predetermined place in the light passing hole.

According to the fourth apparatus of the invention, the pair of left-hand-side and right-hand-side concave grooves are respectively formed in both side portions of the inner surface facing the innermost edge of the half mirror, among the four inner surfaces of the light passing hole. Thus, the fastening device body can be placed in a predetermined manner along the inner surface, which faces the innermost edge of the half mirror, only by inserting both the side edge portions of the fastening device body into both the concave grooves, respectively.

According to the fifth apparatus of the invention, both the presser plate portions can be pressed against a surface of the half mirror by a predetermined pushing force only by pushing the fastening device body into the light passing hole until the catching piece portion bent from a central portion of the fastening device body touches the peripheral edge of the opening portion of the light passing hole. Moreover, the fastening device body is drawn out of the light passing hole only by pulling the catch piece portion. Consequently, the fixed state of the half mirror can easily be canceled.

According to the sixth apparatus of the invention, both the presser plate portions are reinforced in such a manner as not to be twisted. Thus, the half mirror can be more reliably fixed therein by both the presser plate portions.

According to the seventh apparatus of the invention, the nearly-L-shaped recess part of the connecting plate portion is engaged with the opening-portion-side edge of the half mirror. Thus, the half mirror can be reliably fixed therein in such a way as not to unexpectedly move.

What is claimed is:

1. An apparatus for fixing a half mirror of an optical pickup, said half mirror being disposed in a light passing hole of a pickup body so as to be in an inclined state, in which a pair of left-hand-side and right-hand-side concave grooves communicating with an opening portion of a light passing hole are respectively formed in both side portions of an inner surface facing an innermost edge of said half mirror, among four inner surfaces of said light passing hole, and in which both side edge portions of a fastening device body of a fastening device constituted by a leaf spring are inserted into and passed through both said concave grooves, respectively, said apparatus comprising:

a pair of left-hand-side and right-hand-side presser plate portions, which are respectively extended from both side edge portions of said fastening device body and caused to elastically abut against a surface of said half mirror;

a pair of left-hand-side and right-hand-side engaging claw portions respectively bent from both side edge portions of said fastening device body in a direction opposite to a direction, in which said left-hand-side and right-hand-side presser plate portions are extended, to thereby engage with said inner surface; and a catch piece portion bent from a central portion of said fastening device body and extended to a peripheral edge of said opening portion of said light passing hole.

2. An apparatus for fixing a half mirror of an optical pickup, said half mirror being disposed in a light passing hole of a pickup body in such a way as to be in an inclined state, in which a pair of left-hand-side and right-hand-side concave grooves communicating with an opening portion of a light passing hole are respectively formed in both side portions of an inner surface facing an innermost edge of said half mirror, among four inner surfaces of said light passing hole, and in which both side edge portions of a fastening device body of a fastening device constituted by a leaf spring are inserted into and passed through both said concave grooves, respectively, said apparatus comprising:

a pair of left-hand-side and right-hand-side presser plate portions, which are respectively extended from both side edge portions of said fastening device body and caused to elastically abut against a surface of said half mirror;

a connecting plate portion, provided between tip ends of both said presser plate portions, for integrally connecting both said presser plate portions to each other, said connecting plate portion being bent so that a transverse section thereof is nearly-L-shaped, a nearly-L-shaped recess part of said connecting plate portion being engaged with an opening-portion-side edge of said half mirror;

a pair of left-hand-side and right-hand-side engaging claw portions respectively bent from both side edge portions of said fastening device body in a direction opposite to a direction, in which said left-hand-side and right-hand-side presser plate portions are extended, to thereby engage with said inner surface; and a catch piece portion bent from a central portion of said fastening device body and extended to a peripheral edge of said opening portion of said light passing hole.

3. An apparatus for fixing a half mirror of an optical pickup, said half mirror being disposed in a light passing hole of a pickup body in such a way as to be in an inclined state, said apparatus comprising:

a pair of left-hand-side and right-hand-side presser plate portions, which are respectively extended from both side edge portions of a fastening device body of a fastening device constituted by a leaf spring and which are caused to elastically abut against a surface of said half mirror; and a pair of left-hand-side and right-hand-side engaging claw portions respectively bent from both side edge portions of said fastening device body in a direction opposite to a direction, in which said left-hand-side and right-hand-side presser plate portions are extended, to thereby engage with an inner surface of said light passing hole.

4. The apparatus for fixing a half mirror of an optical pickup according to claim 3, wherein a pair of left-hand-side and right-hand-side concave grooves communicating with an opening portion of a light passing hole are respectively formed in both side portions of an inner surface facing an innermost edge of the half mirror, among four inner surfaces of the light passing hole, and in which both side edge portions of the fastening device are inserted into and passed through both the concave grooves, respectively.

5. The apparatus for fixing a half mirror of an optical pickup according to claim 3, which further comprises a catch piece portion bent from a central portion of said fastening device body and extended to a peripheral edge of said opening portion of said light passing hole.

6. The apparatus for fixing a half mirror of an optical pickup according to claim 3, which further comprises a connecting plate portion provided between tip ends of both the presser plate portions and used for integrally connecting both the presser plate portions to each other.

7. The apparatus for fixing a half mirror of an optical pickup according to claim 6, wherein said connecting plate portion is so that a transverse section thereof is nearly-L-shaped, and wherein a nearly-L-shaped recess part of said connecting plate portion is engaged with an opening-portion-side edge of said half mirror.

* * * * *